Nov. 28, 1933.        V. BENDIX ET AL        1,936,899
BRAKE
Filed Sept. 17, 1928        3 Sheets-Sheet 2

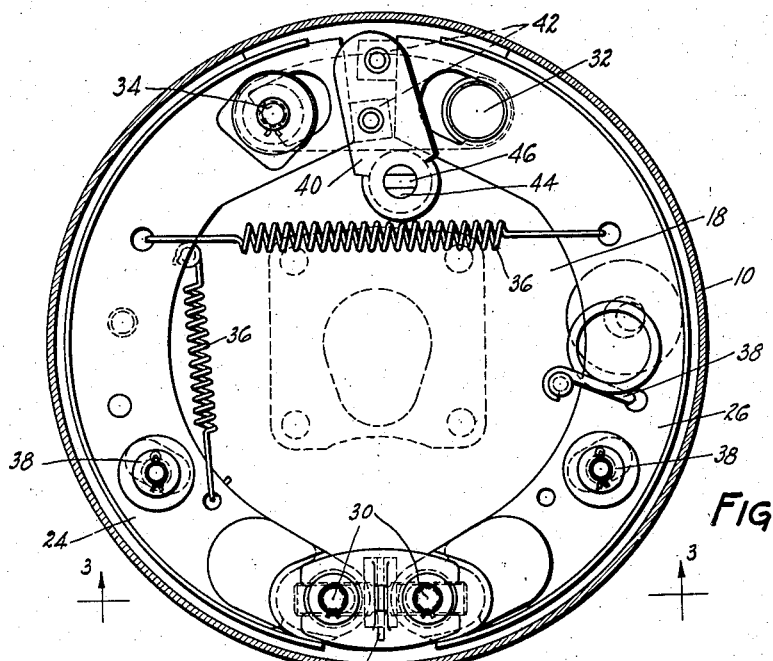
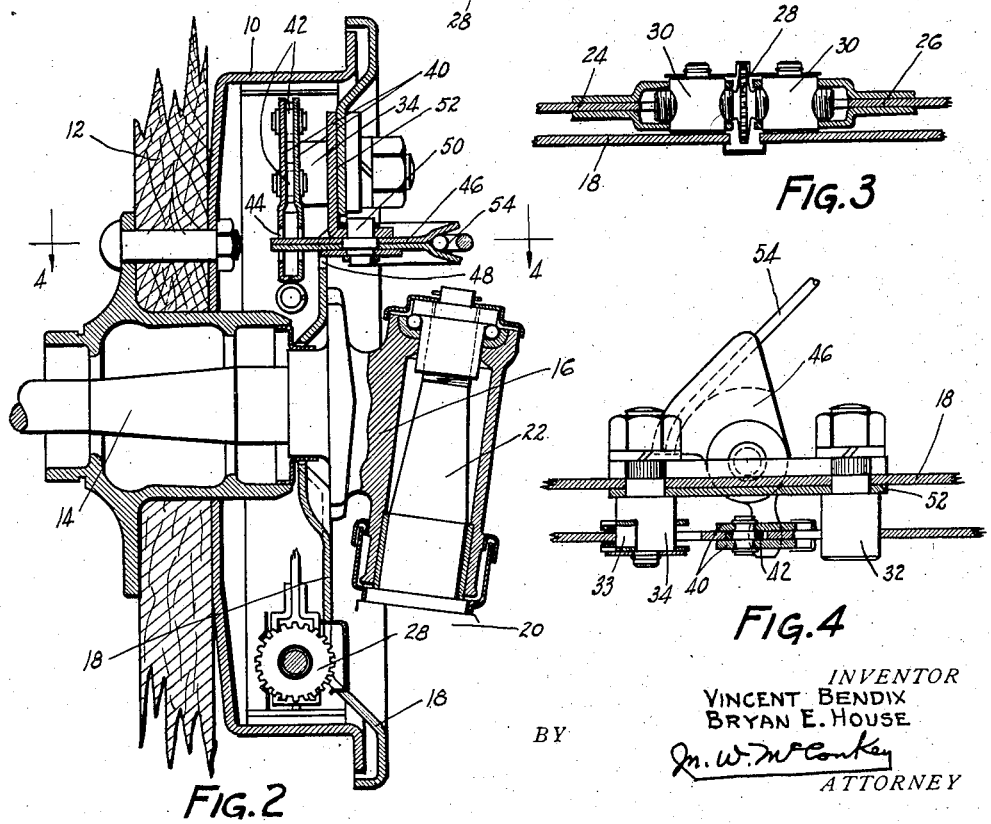

INVENTOR
VINCENT BENDIX
BRYAN E. HOUSE
BY
ATTORNEY

Patented Nov. 28, 1933

1,936,899

UNITED STATES PATENT OFFICE 1,936,899

BRAKE

Vincent Bendix, Chicago, Ill., and Bryan E. House, South Bend, Ind., assignors to Bendix Brake Company, South Bend, Ind., a corporation of Illinois Application September 17, 1928
Serial No. 306,367

10 Claims. (Cl. 188—78)

This invention relates to brakes, and is illustrated as embodied in novel operating means for a brake on a front automobile wheel. An object of the invention is to provide an exceedingly simple operating means, which will not interfere with the swiveling of the wheel when used on a front wheel, and which preferably is adapted for use with a tension cable or the like.

In one desirable arrangement one of the principal parts of the mechanism is a lever, which may be constructed in a novel manner as described below, and which crosses the plane of the backing plate and preferably is mounted on the backing plate. When used with a front brake, we prefer to arrange this lever for operation by a cable or the like engaging it in or immediately adjacent the swiveling axis of the wheel, and which is shown as seated in a curved channel formed in the edge of the lever.

An important feature of the invention relates to the use, with a lever of the described type or its equivalent, of a novel brake-applying cam lever acting on the brake within the drum, and shown with its lower end pivotally (and preferably also slidably) connected to the drum end of the first or horizontal lever.

Other objects and features of the invention, including various novel and desirable details of construction, will be apparent from the following description of the illustrative embodiments shown in the accompanying drawings, in which:

Figure 1 is a vertical section through the brake, just inside the head of the brake drum, and showing the brake shoes in side elevation;

Figure 2 is a central vertical section through the brake, at right angles to Figure 1, and looking forwardly of the car at the left front brake;

Figure 3 is a partial section through the adjustment of the brake, on the line 3—3 of Figure 1;

Figure 4 is a partial section on the line 4—4 of Figure 1, showing the novel operating means;

Figure 5:
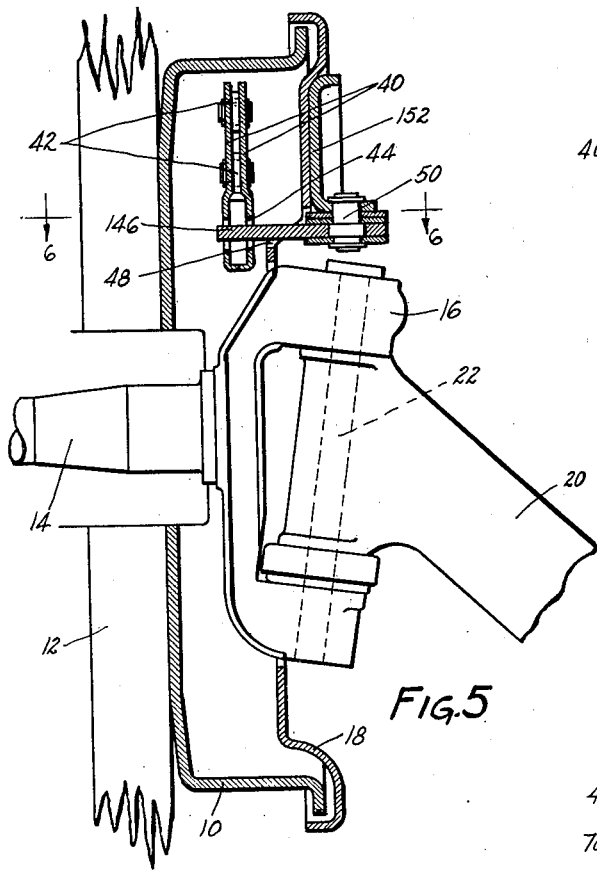
Figure 5 is another vertical section, corresponding to Figure 2, but showing a modified lever arrangement.

The brake selected for illustration, and the details of which are more fully described and are claimed in copending application No. 310,836, filed October 16, 1928 by L. E. LaBrie, includes a rotatable drum 10, secured to a wheel 12 mounted on the spindle 14 of a front knuckle 16 of any desired form. A support such as a backing plate 18, is secured to the knuckle 16 at the open side of the drum. The knuckle 16 may be swiveled at the end of an axle 20 by means such as a kingpin 22 of any desired form.

The friction means of this particular brake comprises a jointed device including shoes 24 and 26 connected by an adjustable right-and-left threaded member 28 threaded into transverse pivots 30 mounted in the shoe ends, and provided with an enlarged central collar to facilitate the adjustment. When the drum is turning counterclockwise in Figure 1, at which time the car is moving forward, shoe 26 anchors against a fixed post 32 carried by the backing plate, while if the drum is turning clockwise it is the shoe 24 which anchors slidably against a half-round block engaging a novel post 34 described in the above identified LaBrie application. The brake is applied against the resistance of suitable return springs 36, and devices 38 may be provided to position the shoes laterally and when the brake is released.

The present invention relates to the improved means for applying the brake, whether or not used with the particular brake shown. The illustrated shoe-engaging part of this means, which part is claimed per se in the said LaBrie application, includes a floating vertical lever built up of a pair of parallel stampings 40, embracing the adjacent shoe ends, and between which are pivoted square thrust blocks 42 slidably engaging the shoe ends. 110

The lower ends of the stampings 40, or equivalent parts of the floating vertical lever, are formed with openings 44 slidably receiving the drum end of a novel horizontal operating lever 46, (Figures 1-4) crossing the plane of the backing plate and extending through an opening 48 in the backing plate and shown fulcrumed on a pivot 50 carried by a stamped support or bracket 52. Bracket 52 may be secured to the backing plate by the anchor posts 32 and 34, so that it also serves to brace and connect the anchor posts.

Lever 52, in the form shown, is built up by projection-welding together the flat faces of two steel stampings, with their edge portions spread apart at the end of the lever outside the backing plate to define a curved channel receiving a tension element such as a cable 54 extending rearwardly and inwardly from the brake toward the chassis frame (not shown). The channel for the element 54 has its center of curvature at the axis of pivot 50, and substantially intersects the swiveling axis of the wheel (i. e. the axis of kingpin 22), the element 54 being tangent to the curved bottom of the channel substantially at the swiveling axis. Thus the brake operation does not interfere with the swiveling of the wheel.

Lever 40—42 can slide or shift slightly lengthwise of the portion of lever 46 which projects through opening 44, so that it does not move sidewise in applying the brake by reason of the horizontal arc followed by the end of lever 44.

Figure 6:
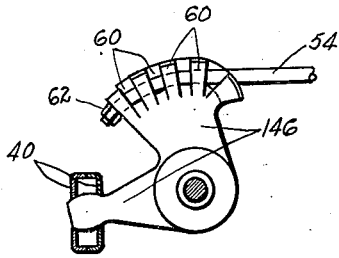
Figure 6 is a partial section on the line 6—6 of Figure 5, showing the horizontal lever.

In the arrangement of Figures 5 and 6, bracket 152, corresponding to bracket 52 except that it is on the outside instead of on the inside of the brake, and which carries the pivot 50, serves as a support for a single-thickness stamped horizontal lever 146 having staggered series of alternately oppositely-bent tongues 60 defining a curved channel receiving the tension element 54. In this arrangement, a nut or the like fitting 62 secured at the end of the element 54 bridges across the end of this curved channel.

Figure 8:
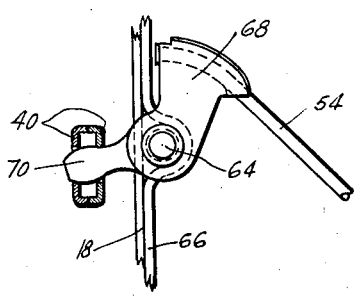
Figure 8 is a partial section on the line 8—8 of Figure 7, showing this form of horizontal lever.
Figure 7:
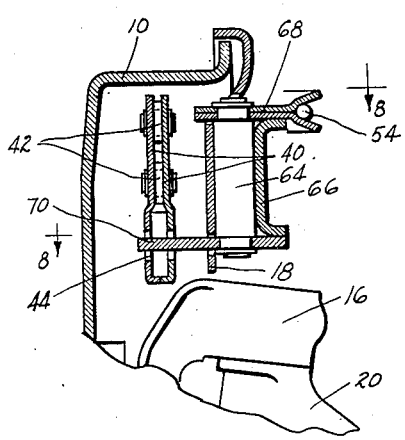
Figure 7 is a partial vertical section, corresponding to the upper portions of Figures 2 and 5, and showing a third lever arrangement.
Figure 10:
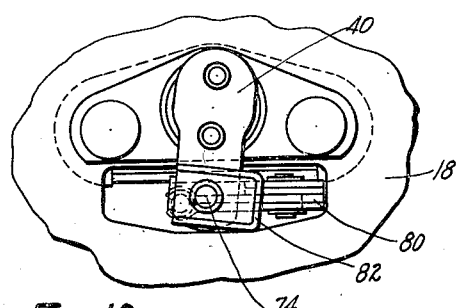
Figure 10 is a section on the line 10—10 of Figure 9, showing the fourth lever in end elevation.
Figure 9:
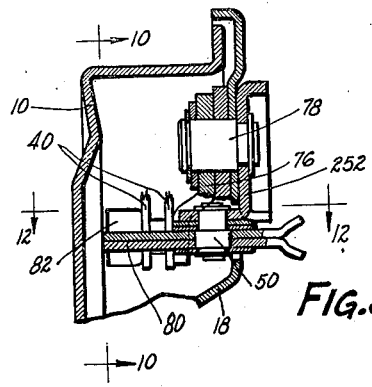
Figure 9 is a partial section corresponding to Figure 7, but showing a fourth lever arrangement.
Figure 11:
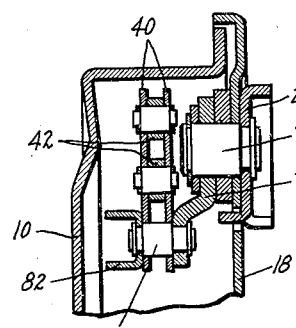
Figure 11 is a section adjacent the plane of Figure 9, but showing the connection to the vertical or brake-applying lever.
Figure 12:
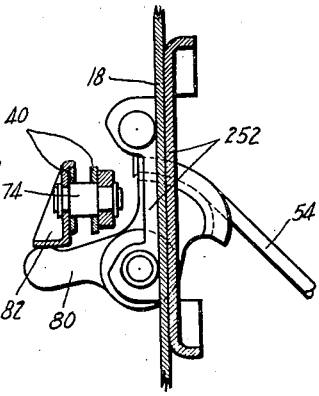
Figure 12 is a section on the line 12—12 of Figure 9, showing this fourth horizontal lever in top plan.

In the arrangement of Figures 7 and 8, the horizontal lever is made by securing together a number of parts, viz.: a vertical pivot 64 having its center embraced by a stamped bearing 66 secured to the backing plate, an upper horizontal arm or lever portion 68 secured to the upper end of the pivot and projecting outwardly on the chassis side of the backing plate, and a lower arm or lever portion 70 secured to the lower end of the pivot 64 and projecting on the drum side of the backing plate. Arm 70 in this case extends through the opening 44 at the lower end of the floating lever 40. Arm 68 is built up by projection-welding together two stampings having their peripheral edges spread apart to define a channel for the tension element 54.

In Figures 9-12, the floating lever 40 is connected by a pivot 74 to an angularly-movable support 76 carried by a pivot 78 mounted on the backing plate. The horizontal lever 80, built up as in the case of lever 68 of a pair of stampings, engages a thrust member 82 carried by the pivot 74. Lever 80 is mounted on the pivot 50 carried by a bracket 252 held by pivot 78 and by the anchor posts.

Figure 13:
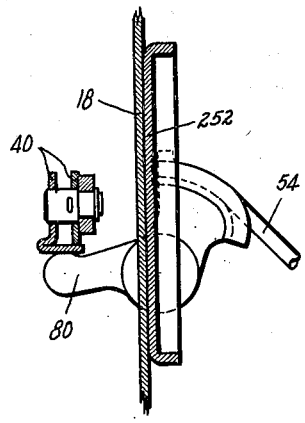
Figure 13 is a view corresponding to Figure 12, but showing a modification of the vertical lever.

In Figure 13 the lever 80 engages a thrust member 84 formed as an extension of one of the stampings 40 and engaging the edge of the other stamping 40.

Figure 14:
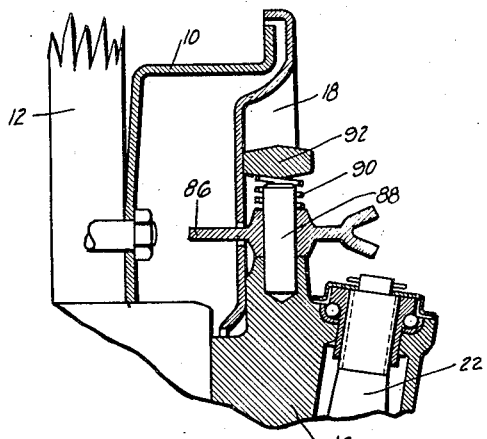
Figure 14 is a section corresponding to Figure 11, but showing the horizontal lever mounted on the knuckle instead of on the backing plate.

In Figure 14, a lever 86, which may correspond to any one of the levers 46, 146, 70, or 80, is fulcrumed on a pivot 88 mounted on the knuckle 16 instead of on the backing plate, the lever being held by an anti-rattle spring 90 sleeved on the end of pivot 88 and confined between lever 86 and a part 92 secured to the backing plate.

While several illustrative embodiments have been described in detail, it is not our intention to limit the scope of the invention to those particular embodiments, or otherwise than by the terms of the appended claims.

We claim:

1. A brake mounted on a swiveled wheel support and including a rotatable drum within which is the brake friction means and adjacent the open side of which is a support, and comprising, in combination therewith, a lever pivotally mounted on said support and having a portion extending in an arc substantially intersecting the swiveling axis, an operating element connected to said portion of the lever, and an applying device acted on by the lever and acting on the brake friction means.

2. A brake mounted on a swiveled wheel support and including a rotatable drum within which is the brake friction means and adjacent the open side of which is a support, and comprising, in combination, a horizontal lever pivotally mounted on said support and having a portion outside the drum extending in an arc substantially intersecting the swiveling axis, an operating element connected to said portion of the lever, and an applying device inside the drum acted on by the lever and acting on the brake friction means.

3. A brake including a rotatable drum within which is the brake friction means and adjacent the open side of which is a support, and comprising, in combination therewith, a lever on said support and having an operating portion at one end, an operating element connected to said operating portion of the lever, and an applying device connected to the other end of the lever and acting on the brake friction means, said lever being mounted to swing in a plane intersecting at right angles the drum radius passing through the applying device.

4. A brake including a rotatable drum within which is the brake friction means and adjacent the open side of which is a support, and comprising, in combination therewith, a lever pivotally mounted on said support and having an operating portion at one end, outside the drum, an operating element connected to said operating portion of the lever, and an applying device inside the drum, connected to the other end of the lever and acting on the brake friction means, said lever being mounted to swing in a plane intersecting at right angles the drum radius passing through the applying device.

5. A brake comprising, in combination, a backing plate having an opening, a bracket adjacent the opening, a lever mounted on the bracket and extending through the opening and a brake-applying lever pivotally and slidably connected at its end to the end of the first lever.

6. A brake for a swiveled wheel comprising a friction element, a floating operating member therefor having an operating lever adapted to move in a horizontal plane and having a portion formed on an arc substantially intersecting the swiveling axis, a flexible operating element wrapped about said portion of the lever and secured thereto and the other end of the lever engaging the operating member.

7. A brake-operating lever having staggered series of bent tongues about a portion of its periphery defining an arcuate channel for a tension connection.

8. A brake having a backing plate, and comprising, in combination therewith, a pivot mounted on and extending parallel to the backing plate, an operating lever arm secured to one end of the pivot and extending at one side of the backing plate, and a brake-applying lever arm secured to the other end of the pivot and extending at the other side of the backing plate.

9. A brake having a backing plate, and comprising, in combination therewith, a pivot mounted on the backing plate, a bearing carried by the backing plate and embracing the central portion of said pivot, an operating lever arm secured to one end of the pivot and extending at one side of the backing plate, and a brake-applying lever arm secured to the other end of the pivot and extending at the other side of the backing plate.

10. A brake having a backing plate, and comprising, in combination therewith, an angularly-movable support pivoted on the backing plate, a brake-applying lever pivoted at its end to said support, and an operating lever pivoted on the backing plate and acting with a brake-applying thrust on said brake-applying lever.

VINCENT BENDIX.
BRYAN E. HOUSE.